United States Patent
Kates et al.

(10) Patent No.: US 9,092,506 B1
(45) Date of Patent: Jul. 28, 2015

(54) PROVIDING A REPORT BASED ON A NEGATIVE KEYWORD

(75) Inventors: Sheridan Kates, New York, NY (US); Alexandra Baugher, San Francisco, CA (US)

(73) Assignee: Google Inc., Mountain View, CA (US)

( * ) Notice: Subject to any disclaimer, the term of this patent is extended or adjusted under 35 U.S.C. 154(b) by 103 days.

(21) Appl. No.: 13/465,870

(22) Filed: May 7, 2012

(51) Int. Cl.
G06F 17/00 (2006.01)
G06F 17/30 (2006.01)

(52) U.S. Cl.
CPC .............................. *G06F 17/30604* (2013.01)

(58) Field of Classification Search
USPC ............. 707/999.101, 999.102, 999.104, 749
See application file for complete search history.

(56) References Cited

U.S. PATENT DOCUMENTS

| | | | |
|---|---|---|---|
| 6,014,680 A | 1/2000 | Sato et al. | |
| 7,136,875 B2 | 11/2006 | Anderson et al. | |
| 7,873,905 B2 | 1/2011 | Taguchi et al. | |
| 7,890,505 B1 * | 2/2011 | Alspector et al. | 707/731 |
| 7,937,405 B2 | 5/2011 | Anderson et al. | |
| 8,229,942 B1 * | 7/2012 | Hubinette | 707/759 |
| 8,688,697 B1 | 4/2014 | Nayar et al. | |
| 2003/0220918 A1 * | 11/2003 | Roy et al. | 707/3 |
| 2007/0050389 A1 * | 3/2007 | Kim et al. | 707/101 |
| 2007/0078699 A1 * | 4/2007 | Scott et al. | 705/10 |
| 2007/0174118 A1 | 7/2007 | Dekel et al. | |
| 2007/0239542 A1 | 10/2007 | Shapiro | |
| 2008/0249875 A1 * | 10/2008 | Lee et al. | 705/14 |
| 2008/0270164 A1 | 10/2008 | Kidder et al. | |
| 2008/0288481 A1 * | 11/2008 | Zeng et al. | 707/5 |
| 2009/0234727 A1 | 9/2009 | Petty | |
| 2009/0292677 A1 | 11/2009 | Kim | |
| 2009/0299998 A1 | 12/2009 | Kim | |
| 2010/0169312 A1 | 7/2010 | Malden et al. | |
| 2010/0185661 A1 * | 7/2010 | Malden et al. | 707/769 |
| 2011/0179009 A1 * | 7/2011 | Nam | 707/708 |
| 2011/0191182 A1 | 8/2011 | Poirier et al. | |
| 2011/0264507 A1 * | 10/2011 | Zhou et al. | 705/14.42 |
| 2014/0041419 A1 | 2/2014 | Plata Amarillas et al. | |

OTHER PUBLICATIONS

U.S. Appl. No. 13/526,158, filed Jun. 18, 2012, Singer, Patrick.
AdCenter Tips: Using the Negative Keyword Conflicts Report, last updated Mar. 26, 2012, retrieved from http://www.location3.com/blog/adcenter-tips-using-the-negative-keyword-conflicts-report/.
Office Action in U.S. Appl. No. 13/526,158 dated Jan. 7, 2015.
US Office Action in U.S. Appl. No. 13/526,158 DTD Jun. 18, 2014.

* cited by examiner

*Primary Examiner* — Hosain Alam
*Assistant Examiner* — Eliyah S Harper
(74) *Attorney, Agent, or Firm* — John D. Lanza; Foley & Lardner LLP (57) ABSTRACT

Methods and systems for providing a report based on a negative keyword may include receiving search query data and advertiser data including a negative keyword, matching the search query data to a negative keyword, and providing display data representing a report including an indication that an advertisement was blocked from being shown in response to a search query based on the negative keyword.

15 Claims, 3 Drawing Sheets

PROVIDING A REPORT BASED ON A NEGATIVE KEYWORD

BACKGROUND

The selection of advertisements for presentation, such as with search results or web pages, may be achieved by various techniques. Certain advertisements may not be selected for presentation based on a number of factors. One of these factors may be a negative keyword selected by the advertiser. The search query terms that match the negative keyword may block an advertisement from being displayed.

SUMMARY

Systems and methods described herein include providing a report based on a negative keyword. In one implementation, a computer-readable storage medium storing instructions that when executed by a computing device cause the computing device to perform operations including receiving search query data received from users over a predetermined period of time. The operations may include receiving advertiser data comprising a negative keyword and selection criteria. The operations may include matching the search query data to at least the negative keyword to analyze whether an advertisement was blocked due to the negative keyword. The operations may include providing display data representing the report comprising an indication that the advertisement was blocked from being shown in response to the search query based on the negative keyword.

In yet another implementation, a system including a tangible computer-readable storage device comprising instructions; and one or more processors coupled to the tangible computer-readable storage device and configured to execute the instructions to perform operations including receiving search query data received from users over a predetermined period of time. The operations may include receiving advertiser data comprising a negative keyword and selection criteria selected by an advertiser. The operations may include matching the search query data to at least the negative keyword to analyze whether an advertisement was blocked due to the negative keyword. The operations may include providing display data representing the report comprising an indication that the advertisement was blocked from being shown in response to the search query based on the negative keyword.

DETAILED DESCRIPTION

An advertiser may identify negative keywords to associate with a particular advertisement or a group of advertisements, i.e., a campaign. The negative keyword may be matched with one or more words, terms, phrases, symbols, etc. in a search query in order to display relevant advertisements for presentation to the user.

For example, a company selling compression socks may have a number of advertisements, and may identify terms such as "fracture," "data", "engine," and "audio" as negative keywords to associate with the advertisements for compression socks. These advertisements may not be considered by the system for display when search results are displayed to a user who enters such terms. The comparison may be made between a search or a query and the advertisement itself. The negative keyword may block an advertisement with a "partial" match, for example, if the query includes terms that are known synonyms, misspellings/mistypings, variations, etc. of the negative keyword.

One or more implementations may provide the advertiser a report showing the search query terms that were used to block an advertisement. An advertiser may have chosen to temporarily block a category of queries (e.g., if an item is out of stock), but ends up permanently blocking the category longer than what was intended. This would result in the advertiser unintentionally blocking search queries.

The report may allow advertisers to view which queries were blocked as a result of their negative keyword lists. The report may be generated in an offline process comparing the set of queries that ran over the course of a day (filtering out any queries that don't meet a specific privacy threshold) and matching them to the advertiser's negative keywords to see which advertisements may have been blocked. The report may account for the advertiser's selection criteria (e.g. day parting, geographical, etc).

The report may not guarantee that the advertisement would have shown up on the queries (e.g., if the campaign did not include the negative keyword), as there are other factors to be considered, such as bids, predictions, and quality score. However, the report may allow the advertiser to identify whether an advertisement has been inadvertently blocked due to a negative keyword. The advertiser then has the ability to delete or modify existing negative keywords.

The advertiser is able to filter out unwanted impressions and/or reduce cost-per-click by using a negative keyword. However, a number of different match types (e.g., broad match, phrase match, exact match) that map differently to queries may be inadvertently blocked. For example, user queries may be matched to the advertiser's keyword(s) as well as variations of the keyword entry including misspellings, plurals, and synonyms, according to one embodiment. With respect to the keyword entry "rental car," an executed broad match search may also search for keyword entries such as "rental cars," "renting cars," and "rental vehicles," for example. Generally, categorizing a keyword entry as a broad match may increase the impressions, but may also decrease the percentage of users clicking on the generated advertisement data, or click through rate. This may be because keyword entries categorized as broad matches generate advertising display data associated with a higher volume of keyword entries that may not be as relevant to the advertising display data generated, potentially leading to a lower likelihood that a user who entered a particular keyword entry will be interested in the advertising data generated.

According to some implementations, keyword entries categorized as phrase match entries may generate advertisement data in response to search engine queries that include terms other than the exact keyword entry. For example, if the keyword entry is "rental car" and is categorized as a phrase match keyword entry, advertising data is generated when the search engine query is "rental car," or when the search engine query is "rental car" preceded and/or followed by additional terms such as the search engine query "cheap rental car," or "rental car Spain," according to one embodiment. Furthermore, executed exact match keyword searches may only generate associated advertising data when the exact keyword entry "rental car" is searched. If a keyword entry is categorized as an exact match keyword entry by an advertiser in advertiser account 202, search queries such as "rental cars," and "cheap rental car" would not generate advertising data associated with the keyword entry "rental car."

Generally, categorizing a keyword entry as an exact match may decrease the overall amount of clicks on a displayed advertisement, which may be desirable to advertisers paying a website, such as a search engine, on a per-click basis. Categorizing a keyword entry as an exact match may also increase the percentage of users clicking on the generated advertisement data, or click through rate for the keyword entry. Categorizing a keyword entry as an exact match may also increase the keyword entry's conversion rate, or proportion of the number of times an advertisement is generated or displayed to the user of a search engine compared with the number of times the user performs a particular action such as purchasing the advertised product or service, or providing contact information, for example.

Negative keywords may be selected by the advertiser or content provider if a search term is not relevant enough to the products or services that are offered. One or more implementations may allow an advertiser to determine the number and/or types of queries that have been blocked due to their selection of negative keywords.

Figure 1:
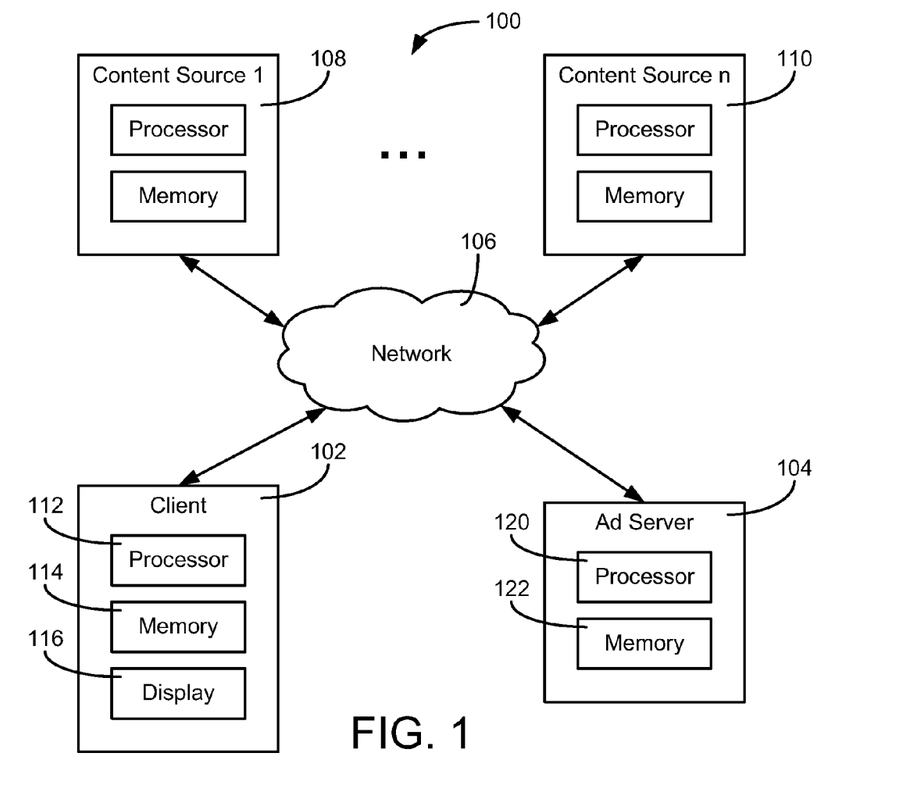
FIG. 1 illustrates an example of a computer system in accordance with a described implementation.

FIG. 1 is a block diagram of a computer system 100 in accordance with a described implementation. System 100 includes client 102, which may communicate with other computing devices via a network 106. For example, client 102 may communicate with one or more content sources ranging from a first content source 108 up to an nth content source 110. Content sources 108, 110 may provide webpages and/or media content (e.g., audio, video, and other forms of digital content) to clients client 102. System 100 may include an advertisement server 104, which provides advertisement data to other computing devices over network 106.

Network 106 may be any form of computer network that relays information between client 102, advertisement server 104, and content sources 108, 110. For example, network 106 may include the Internet and/or other types of data networks, such as a local area network (LAN), a wide area network (WAN), a cellular network, satellite network, or other types of data networks. Network 106 may include any number of computing devices (e.g., computer, servers, routers, network switches, etc.) that are configured to receive and/or transmit data within network 106. Network 106 may include any number of hardwired and/or wireless connections. For example, client 102 may communicate wirelessly (e.g., via WiFi, cellular, radio, etc.) with a transceiver that is hardwired (e.g., via a fiber optic cable, a CAT5 cable, etc.) to other computing devices in network 106.

Client 102 may be any number of different user electronic devices configured to communicate via network 106 (e.g., a laptop computer, a desktop computer, a tablet computer, a smartphone, a digital video recorder, a set-top box for a television, a video game console, etc.). Client 102 is shown to include a processor 112 and a memory 114, i.e., a processing circuit. Memory 114 stores machine instructions that, when executed by processor 112, cause processor 112 to perform one or more of the operations described herein. Processor 112 may include a microprocessor, application-specific integrated circuit (ASIC), field-programmable gate array (FPGA), etc., or combinations thereof. Memory 114 may include, but is not limited to, electronic, optical, magnetic, or any other storage or transmission device capable of providing processor 112 with program instructions. Memory 114 may include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which processor 112 can read instructions. The instructions may include code from any suitable computer-programming language such as, but not limited to, C, C++, C#, Java, JavaScript, Perl, Python and Visual Basic.

Client 102 may include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of client 102 (e.g., a built-in display, microphone, etc.) or external to the housing of client 102 (e.g., a monitor connected to client 102, a speaker connected to client 102, etc.), according to various implementations. For example, client 102 may include an electronic display 116, which visually displays webpages using webpage data received from content sources 108, 110 and/or from advertisement server 104.

Content sources 108, 110 are electronic devices connected to network 106 and provide media content to client 102. For example, content sources 108, 110 may be computer servers (e.g., FTP servers, file sharing servers, web servers, etc.) or other devices that include a processing circuit. Media content may include, but is not limited to, webpage data, a movie, a sound file, pictures, and other forms of data. Similarly, advertisement server 104 may include a processing circuit including a processor 120 and a memory 122. In some implementations, advertisement server 104 may include several computing devices (e.g., a data center, a network of servers, etc.). In such a case, the various devices of advertisement server 104 may comprise a processing circuit (e.g., processor 120 represents the collective processors of the devices and memory 122 represents the collective memories of the devices).

Advertisement server 104 may provide digital advertisements to client 102 via network 106. For example, content source 108 may provide a webpage to client 102, in response to receiving a request for a webpage from client 102. In some implementations, an advertisement from advertisement server 104 may be provided to client 102 indirectly. For example, content source 108 may receive advertisement data from advertisement server 104 and use the advertisement as part of the webpage data provided to client 102. In other implementations, an advertisement from advertisement server 104 may be provided to client 102 directly. For example, content source 108 may provide webpage data to clients client 102 that includes a command to retrieve an advertisement from advertisement server 104. On receipt of the webpage data, client 102 may retrieve an advertisement from advertisement server 104 based on the command and display the advertisement when the webpage is rendered on display 116.

According to various implementations, a user of client 102 may search for, access, etc. various documents (e.g., web pages, web sites, articles, images, video, etc.) using a search engine via network 106. The web pages may be displayed as a search result from a search engine query containing search terms or keywords. Search engine queries may allow the user to enter a search term or keyword into the search engine to execute a document search. Search engines may be stored in memory 122 of server 104 and may be accessible with client 102. The result of an executed website search on a search engine may include a display on a search engine document of links to websites. Executed search engine queries may result in the display of advertising data generated and transmitted from server 104. In some cases, search engines contract with advertisers to display advertising to users of the search engine in response to certain search engine queries.

In another implementation, advertisers may purchase or bid on the search terms such as keyword entries entered by users into a document such as a search engine. When the search term or keyword are entered into the document, then advertising data such as links to an advertiser website may be displayed to the user. In some implementations, server 104 may use an auction model that generates an advertisement. Advertisers may bid on keywords using the auction model.

Figure 2:
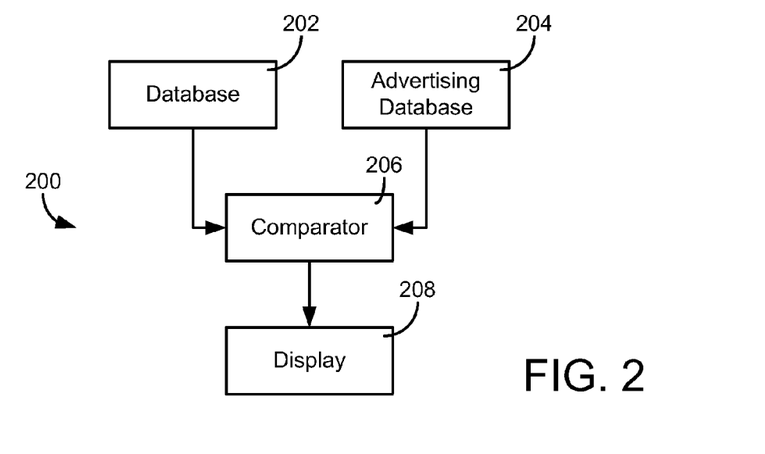
FIG. 2 is a block diagram of an example of a system for providing a report based on a negative keyword in accordance with a described implementation.

FIG. 2 illustrates an example of a system for providing a report based on a negative keyword. In a brief overview, system 200 may include database 202, advertising database 204, comparator 206, and display 208.

System 200 may include database 202 for storage of a query. A user may enter the query into a graphical user interface of a search engine, e.g., using a web browser. The query may be transmitted to a server, servers, data center(s), etc. using a transmission protocol, e.g., HTTP in order to provide search results and relevant advertisements. The query may be stored as query data within database 202. Query data may include a list of queries for a period of time. The period of time may be predetermined by system 200, an advertiser, a content source (e.g., content provider), etc. The period of time may be approximately one day. Any appropriate period of time may be implemented, altered, etc. to determine the list of queries.

The list of queries may depend upon a filter of queries based on privacy criteria. For example, a user may view, manage, and opt out of log information from being stored on the client device or a server while performing a search. In some implementations, the user may opt out of advertising cookies as well as ads customization.

A user may opt in or out of allowing server 104 or other content source to identify and store information about the user and/or about devices operated by the user. For example, the user may opt in to receiving advertisements from server 104 that may be more relevant to her. In one implementation, the user may be represented as a randomized user identifier (e.g., a cookie, a device serial number, etc.) that contains no personally-identifiable information about the user. For example, information relating to the user's name, demographics, etc., may not be used by an content selection server unless the user opts in to providing such information. Thus, the user may have control over how information is collected about him or her and used by an content selection server or other content source.

If content is selected based in part on a user identifier for a user that opts in to receiving more relevant content, a content provider may specify that certain content is to be provided to a set of user identifiers. For example, an advertiser may identify a set of user identifiers associated with visiting the advertiser's website and making a purchase. Such users may later wish to know if the advertiser is running a sale. In some cases, an advertising network may identify users on behalf of the advertiser that may be interested in receiving advertisements from the advertiser. For example, advertisers may specify a number of topic categories for their advertisements and the advertising network may match users' interests to the categories, to provide relevant advertisements to the users.

System 200 may include advertising database 204 for storage of advertisements, selection criteria, negative keywords, etc. Advertising database 204 may receive information to be stored from an advertiser. For example, the stored information may be entered, altered, tracked, etc. by an advertiser. Advertisement information may include the advertisements. The advertisements may include banner ads, text ads, image ads, video ads, audio ads, a combination of these types of ads, etc. The advertisements may include embedded information such as a hyperlink, metadata, executable instructions, etc. In some implementations, the advertisement(s) may include a hyperlink to a URL (e.g., a home page of an advertiser, a webpage related to the advertised product, etc.).

The advertisements may be retrieved from advertising database 204 based on a request for advertisements by a content source, which receives requests for content (e.g., search results, articles, music, etc.). The requests for content may be received from client device 102. The advertisements may be retrieved based on advertiser criteria.

Advertiser criteria may include information regarding accounts, campaigns, advertisement group comprised of individual advertisements, selection criteria, etc. An account is related to information for a specific advertiser (e.g., a unique identifier such as an email address, user name/handle, a password, billing information, etc.). A campaign is related to a group of one or more advertisements that may include certain information, such as, but not limited to, a start/end time, budget allocation, geographical targeting information, etc. For example, a fashion designer may have an advertising campaign for its shoe division and another advertising campaign for its clothing division. Each advertisement group (e.g., one or more ads) under each campaign may include budgetary information. Budgetary information may include cost per selection (e.g., maximum, average), cost per conversion (e.g., maximum, average), etc. The budgetary information may be aligned with selection criteria.

Each advertisement group (e.g., one or more ads) under each campaign may include selection criteria. Selection criteria may include a keyword, a topic, geographical location information, user profile information, user device characteristics, language of user interface, type of network (search engines, content-based network, etc.), frequency of advertisements (e.g., dayparting, etc.), etc.

In some implementations, the advertiser may want to prevent their advertisements from displaying for search queries. Advertising database 204 may be configured to receive negative keywords from an advertiser and to associate the negative keywords with an advertisement. If a negative keyword is associated with an advertisement, the advertisement may be shown only if a search query does not match the negative keyword, i.e., the advertisement won't show for search queries including the negative keyword. For example, a health center having a blood drive may select to advertise with the keyword "blood," but may select the negative keyword "vampire," so that the advertisements don't match search queries like "vampire blood." In another example, an advertisement may not be relevant if the search query (or other advertisement request information) includes the negative keyword. In an example, if a keyword is "trial" and a negative keyword is "free," then the advertisement may not be relevant if the search query (or other advertisement request information) is "free trial."

Negative keywords may include a word, a term (e.g., a specific usage or definition of a word), a phrase, a quotation, etc. For example, a keyword may be defined as a word or phrase relevant to a document (e.g., webpage, website, article, discussion board, blog, etc.). Keyword may be used interchangeably with "terms" or "search terms" in some contexts, e.g. In some implementations, search terms and keywords may be differentiated to distinguish between external and internal searches. For example, "keyword" may be associated with an external search engine, i.e., a user found a website after performing a search for "shoes" on a search engine website would be associated with the keyword "shoes." In contrast, a "search term" may be any word a user searches for using the internal website search. For example, if the user that came to the shoes website from the search engine via the keyword "shoes", then uses the shoes website's search functionality to search for "mules", then the user may be associated with the keyword "shoes" and the search term "mules."

Negative keywords may be preferences selected by content publishers, or an advertiser. Negative keywords may include negative keyword suggestions. For example, a negative keyword suggestion may include overall popular keywords, keywords matching the initial negative keyword provided by an advertiser, etc. The negative keyword suggestion may be implemented as an auto-suggestion field. The negative keyword suggestions may be received from advertising data. For example, if most advertisers include the negative keyword "luxury" when the advertisement is directed toward "car", then system 200 may automatically suggest "luxury" as a negative keyword. In some implementations, the advertiser or content provider may select an option for a keyword that includes preventing advertisements related to the text of the keyword, a URL of the keyword, etc. The text of the keyword may include one or more words, the entirety of a website, etc. For example, the health center may specify "vampire blood" as negative text, and this may be generalized into all topics, concepts, content, etc. related to vampires, werewolves, etc.

In another example, for the negative keyword, "shoes", the advertiser or content provider may prevent advertisements related to a URL that directs the user to shoes. In some implementations, the advertiser or content provider may include the competitor as the negative keyword, if or where permissible. For example, the competitor of an advertiser or content provider may be identifier by analyzing the text of the competitor's webpage, advertisements, and selection criteria compared with other advertisers.

Negative keywords may include variations of the keyword. In some implementations, the advertiser or content provider may select an option to include variations of the negative keyword. Variations may include synonyms of the negative keyword, gerund forms of the negative keyword, etc. For example, for shoes, variations may include sneakers, stilettos, high heels, etc. In some implementations, the negative keyword variations may be compiled from a number of sources (e.g., thesaurus tool, other web pages, historical data, etc.) and stored. Server 104 may receive a request for variations or may provide variations of the negative keyword without requiring a request, e.g., user input may not be required. In some implementations, server 104 may retrieve variations of the negative keyword from content sources 108, 110. Server 104 may provide the variations of the negative keyword as display data to the user for selection.

Advertising data from advertisement database 204 and queries from search engine 202 may be provided to comparator 206. Comparator 206 compares the queries with the advertising data. Comparator 206 may include a processing circuit configured to compare the queries with the advertising data, specifically the negative keywords. Comparator 206 may flag any search query that was blocked as a result of the negative keyword.

In some implementations, comparator 206 may be configured to perform the comparison using batch processing. Batch processing may include processing the advertising data and queries at specified times. For example, on a predetermined date and/or time, the queries and the advertising data are provided to comparator 206, and comparator 206 may be configured to compare each query along with corresponding advertising data at the same time. In an example, a set of queries that include the word "shoes" may be compared to the negative keyword, "horns". The compared data may be accumulated and stored for processing. The compared data may be retrieved as a batch or as a group at another location, e.g., a sever, a data center, etc. The batch may then be processed periodically.

In another implementation, the compared data may be sorted into a sequence. In some implementations, the sorting may be performed off-line, e.g., before providing the queries and the advertising data to comparator 206, the queries and the advertising data are sorted offline (i.e., apart from comparator 206). The flagged queries that were blocked as a result of the negative keyword may be compiled into a report to be provided as display data on display 208.

Figure 3:
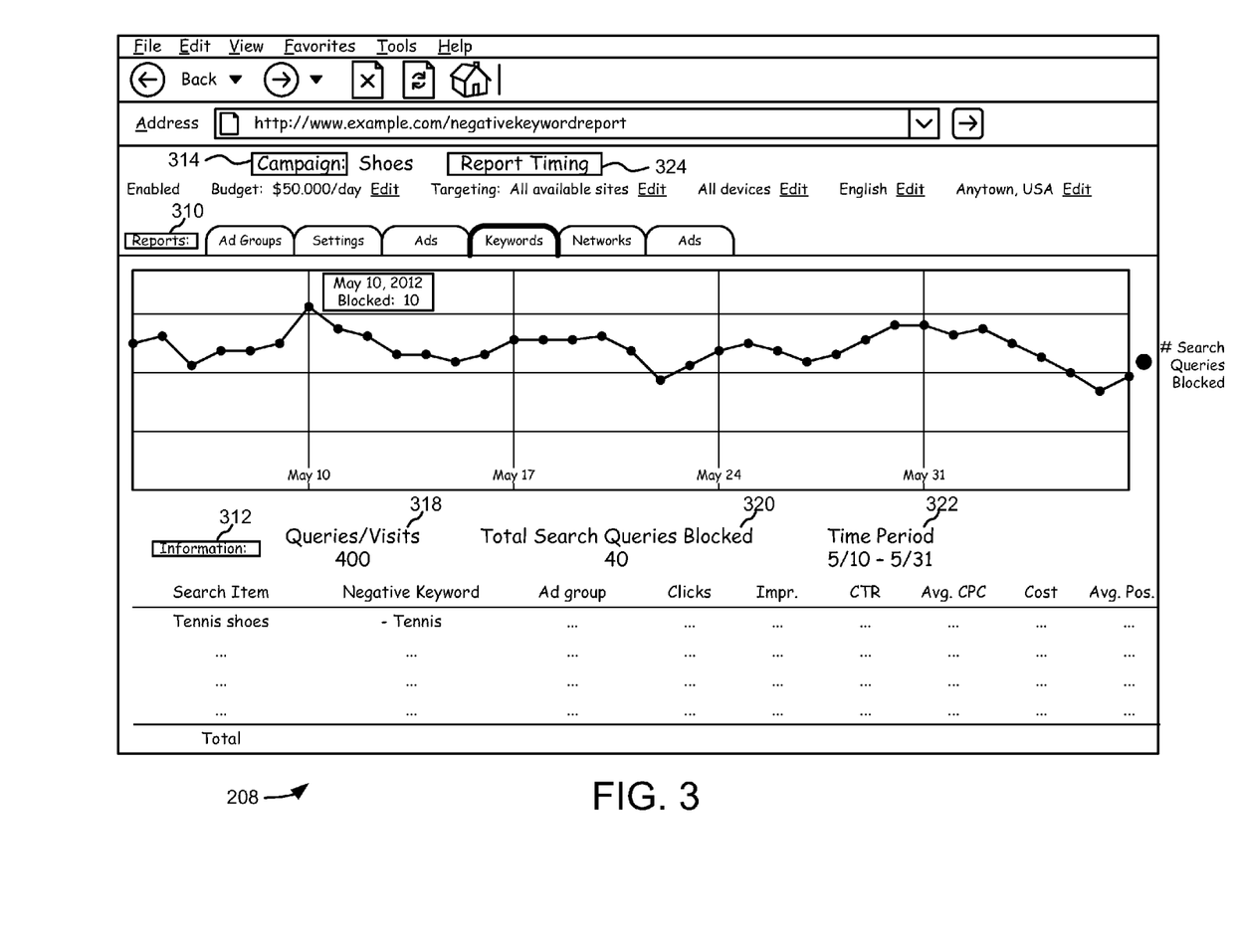
FIG. 3 illustrates an example of a report based on a negative keyword in accordance with a described implementation.

FIG. 3 is an illustration of an example of a display 208 in accordance with a described implementation. Display 208 may be configured as a graphical user interface to allow the advertiser to generate the report that will notify an advertiser. Display 208 may be external to a desktop computer (e.g., display 208 may be a monitor), may be a television set, or any other stand-alone form of electronic display. In another example, display 208 may be internal to a laptop computer, mobile device, or other computing device with an integrated display.

In some implementations, the advertiser may decide to generate additional reports. In this example, a report for query searches that are blocked by negative keywords was selected. Display 208 may include a number of items to allow the advertiser to generate various types of reports and to determine which query statistics to view. Display 208 may include a portion 310 to allow the advertiser to determine which type of report to generate. Display 208 may include a portion 312 to allow the advertiser to determine which type of information to include within the report. In this example, the advertiser has selected to display the campaign 314, the negative keyword 316, the number of queries/visits 318, the number of search terms blocked 320, the time period 322, etc. Display 208 may include a portion 324 to allow the advertiser to schedule the report to be generated periodically. For example, the report may be provided at predetermined intervals (e.g., hourly, daily, etc.). Alternative modes of delivery may be employed, such as SMS, MMS, email, etc to provide the report. The report may be generated in response to a triggering event. For example, the report may be provided when n number of search queries are blocked as a result of the negative keyword. The advertiser may receive an email notice or another appropriate notification every time a report is generated.

Figure 4:
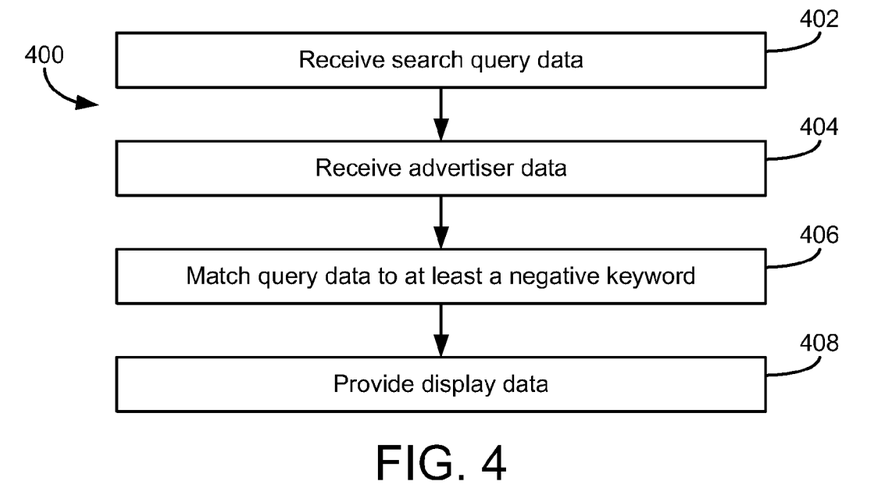
FIG. 4 is a flow diagram of an example of a method in accordance with a described implementation.

FIG. 4 is an illustration of an example of a flow diagram of method 400 for providing display data is shown in accordance with a described implementation. Method 400 may be implemented online, offline or as a combination of both offline or online. Method 400 may be implemented by a variety of systems and components.

Example method 400 begins at block 402, in which search query data is received from users over a period of time. The search query data may be retrieved from a memory that stores a database. Search query data may include a list of past (or real time) search queries entered by users into a search engine website for a certain time period. The period of time may be predetermined, e.g., one day. In other implementations, the period of time may be determined by the advertiser, or other entity that is interested in the negative keyword report.

At block 404, advertiser data is received. Advertiser data may be received at a server computer system. In some implementations, advertiser data may be received by a client device in communication with a web browser. The advertiser data may include negative keywords that have been selected by the advertiser, the content provider, or by the system (e.g., by default, pre-generated, etc.). The advertiser data may include the advertiser's selection criteria.

For example, the system implementing example method 400 may analyze queries from last week. The advertiser's selection criteria may include: the United States, as a geographic criterion, the keyword, "shoes," and the negative keyword may be "red."

At block 406, the search query data is matched to at least the negative keyword to analyze whether an advertisement was blocked due to the negative keyword. For example, a query from last week, "red patent leather flats" in the United Kingdom, may be provided in the report, because "red" is a negative keyword. In some implementations, this information may not be provided in the report, if the search query data is matched to the advertiser's selection criteria, if the advertiser is not interested in advertising to the United Kingdom (e.g., the advertiser is only interested in search queries performed in the United States.)

In some implementations, the search query data is compared to the advertiser data. For example, the advertiser data may block the search query data based on the location of the user, if the advertiser has selected not to advertise to that particular location. Based on the comparison, a determination is made as to whether an advertisement was blocked from being shown to a user due to the negative keyword appearing in a search query received from a user. An indication that the advertisement was blocked may be stored in a memory, e.g., for later retrieval.

At block 408, display data representing the report is provided. The report may be provided in response to a request for the report. The report may include an indication that the advertisement was blocked from being shown in response to the search query based on the negative keyword.

In some implementations, the search query data and advertiser data is received and matched in real time, i.e., as search queries are being entered. In other implementations, the logging may be increased at serving time, e.g., every time a search query is blocked due to a negative keyword, flag the search query and store the data in a table. When the advertiser requests the negative impressions report, then the table could be retrieved.

In some implementations, the report may display queries that were blocked based on the negative keyword or queries that would have been blocked based on the negative keyword had the query otherwise met the advertising criteria. In another implementation, the report may display the additional advertising criteria that was met or not met. For example, the report may display that a search query was blocked based on a negative keyword and, for that query, which advertising criterion were met and which ones were not met.

Figure 5:
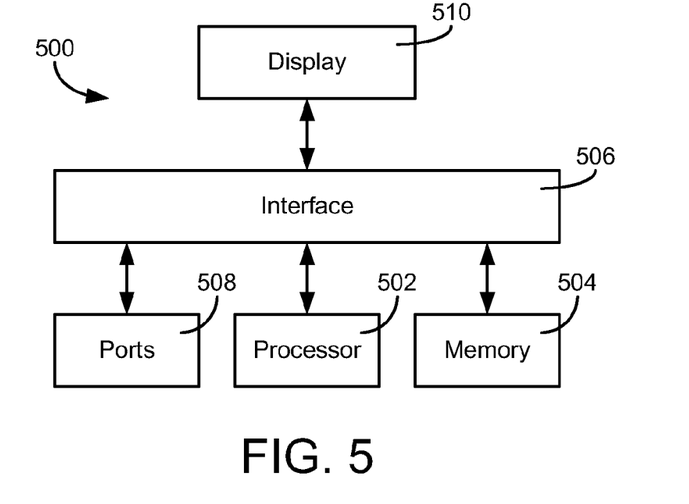
FIG. 5 is a block diagram of an example of devices that may be used to implement the systems and methods in accordance with the described implementations.

FIG. 5 is a block diagram of a computing device 500 that may be used to implement the systems and methods in accordance with the described implementations, as either a client or as a server or plurality of servers. Computing device 500 may include, but is not limited to, digital computers, such as laptops, desktops, workstations, personal digital assistants, servers, blade servers, mainframes, cellular telephones, smartphones, mobile computing devices (e.g., a notepad, e-reader, etc.) etc.

Computing device 500 includes a processor 502, memory 504, an interface 506 and ports 508. Each of the components 502, 504, 506, and 508, are interconnected using various busses, and may be mounted on a common motherboard or in other manners as appropriate. The processor 502 can process instructions for execution within the computing device 500, including instructions stored in the memory 504 to display graphical information for a GUI on an external input/output device, such as display 510 coupled to interface 506.

In other implementations, multiple processors and/or multiple buses may be used, as appropriate, along with multiple memories and types of memory. Multiple computing devices 500 may be connected, with each device providing portions of the necessary operations (e.g., as a server bank, a group of blade servers, a multi-processor system, etc.). The ports 508, which may include various communication ports (e.g., USB, Bluetooth, Ethernet, wireless Ethernet, etc.), may be coupled to one or more input/output devices, such as a keyboard, a mouse, a pointing device, a scanner, etc., or a networking device (a switch, adapter, bridge, router, hub, repeater, etc.).

The processor 502 may provide, for example, for coordination of the other components of the device 500, such as control of user interfaces, applications run by device 500, and wireless communication by device 500. Processor 502 may communicate with a user via interface 506 (e.g., control, display, external, etc.), coupled to a display 510. The display 510 may be, for example, a TFT (Thin-Film-Transistor Liquid Crystal Display) display, an OLED (Organic Light Emitting Diode) display, other flexible display, etc. Interface 506 may include circuitry for driving the display 510 to provide graphical, textual, and other information to a user. Interface 506 may receive commands (e.g., voice-activated, text, etc.), from a user and convert them to provide to the processor 502.

In addition, interface 506 may be provided to communicate with processor 502 and enable near area communication of device 500 with other devices. Interface 506 may provide, for example, for wired communication. In some implementations, multiple interfaces may be used. Computing device 500 may communicate wirelessly through interface 506, which may include digital signal processing circuitry where necessary. Interface 506 may provide for communications under various modes or protocols, such as GSM voice calls, SMS, EMS, or MMS messaging, CDMA, TDMA, PDC, WCDMA, CDMA2000, or GPRS, etc. Such communication may occur, for example, through a radio-frequency transceiver. In addition, short-range communication may occur, such as using a Bluetooth, WiFi, or other such transceiver. In addition, GPS (Global Positioning System) receiver module may provide additional navigation- and location-related wireless data to device 500, which may be used as appropriate by applications running on device 500. The device 500 may be provided with a storage device to provide additional storage, e.g., solid-state flash media. Each of the components may be interconnected using various buses. Several of the components may be mounted on a common motherboard or in other appropriate manners.

Device 500 may communicate audio feedback. In some implementations, an audio codec may receive spoken information from a user and convert it to usable digital information. The audio codec may generate audible sound for a user, such as through a speaker, e.g., in a handset of device.

Sound(s) may include sound from voice telephone calls, recorded sound (e.g., voice messages, music files, etc.), sound(s) generated by applications operating on device, etc.

The memory 504 stores information within the computing device 500. In one implementation, the memory 504 is a volatile memory unit or units. In another implementation, the memory 504 is a non-volatile memory unit or units. The memory 504 may be another form of computer-readable storage medium, such as a magnetic or optical disk. The memory 504 may be capable of providing mass storage for the computing device 500. In one implementation, the memory 504 may be or contain a computer-readable storage medium, such as a floppy disk device, a hard disk device, an optical disk device, or a tape device, a flash memory or other similar solid state memory device, or an array of devices, including devices in a storage area network or other configurations.

A computer program product may be tangibly embodied in an information carrier. The computer program product may contain instructions that, when executed, perform one or more methods, such as those described above. The information carrier is a computer or machine-readable storage medium, such as the memory 504, memory on processor 502, etc. Expansion memory may be provided and connected to device 500 through interface 506. The computer or machine-readable storage medium does not include a transitory signal.

These computer programs (e.g., programs, software, software applications or code), include machine instructions for a programmable processor, and can be implemented in a high-level procedural and/or object-oriented programming language, and/or in assembly/machine language. As used herein, the terms "machine-readable storage medium" and "computer-readable storage medium" refers to any computer program product, apparatus and/or device (e.g., magnetic discs, optical disks, memory, Programmable Logic Controllers (PLCs) Programmable Logic Devices (PLDs)), used to provide machine instructions and/or data to a programmable processor.

To provide for interaction with a user, the systems and techniques described here can be implemented on a computer having a display device (e.g., a CRT (cathode ray tube) or LCD (liquid crystal display) monitor), for displaying information to the user and a keyboard and a pointing device (e.g., a mouse or a trackball), by which the user can provide input to the computer. Other kinds of devices can be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

Various implementations of the systems and techniques described here can be realized in digital electronic circuitry, integrated circuitry, specially designed ASICs (application specific integrated circuits), computer hardware, firmware, software embodied on a tangible medium, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box (STB), Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A STB or set-top unit (STU) may include an information appliance device that may contain a tuner and connect to a television set and an external source of signal, turning the signal into content, which is then displayed on the television screen or other display device.

A smart television module may be configured to provide a home screen or top level screen including icons for a plurality of different applications, such as a web browser and a plurality of streaming media services (e.g., Netflix, Vudu, Hulu, etc.), a connected cable or satellite media source, other web "channels," etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone or other mobile phone or handheld computer, a tablet PC, or other computing device.

The systems and techniques described here can be implemented in a computing system that includes a back-end component, a middleware component, or a front-end component, or any combination of back-end, middleware, or front-end components. The components of the system may be interconnected by any form or medium of digital data communication (e.g., a communication network). Examples of communication networks include a local area network ("LAN"), a wide area network ("WAN"), and the Internet.

While this specification contains many specific implementation details, these should not be construed as limitations on the scope of any disclosures or of what may be claimed, but rather as descriptions of features specific to particular implementations of particular disclosures. Certain features that are described in this specification in the context of separate implementations may be implemented in combination in a single implementation. Conversely, various features that are described in the context of a single implementation may be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous

What is claimed is:

1. A non-transitory computer readable storage medium storing instructions that when executed by a computing device cause the computing device to perform operations comprising:
- retrieving a database record from a database stored in a memory element, the record storing search query data received from a plurality of computing devices via a computer network over a predetermined period of time;
- receiving, via the computer network from a second computing device of an advertiser, advertiser data comprising a negative keyword that blocks an advertisement from display responsive to the search query data including the negative keyword;
- receiving, from a source, negative keyword variations of the negative keyword;
- storing the negative keyword variations;
- merging the negative keyword variations with the negative keyword;
- matching, by a comparator processing circuit configured on the computing device, the search query data to at least the negative keyword, the negative keyword merged with the negative keyword variations;
- determining, based on the matching, that the advertisement was blocked due to a negative keyword variation of the negative keyword;
- storing, in memory, an indication that the determined advertisement was blocked due to the search query data matching at least the negative keyword variation;
- generating, using the stored indication, a report that identifies the advertisement was blocked from display in response to the search query data including the negative keyword variation, the search query data filtered out from the report based on a privacy threshold; and
- transmitting, via the computer network to the second computing device for display on a display device coupled to the second computing device, the report.

2. The computer readable storage medium of claim 1, wherein the report comprises queries received in a predetermined period of time.

3. The computer readable storage medium of claim 2, wherein the predetermined period of time is approximately one day or less.

4. The computer readable storage medium of claim 1, wherein the negative keyword is selected by content publishers or the advertiser.

5. The computer readable storage medium of claim 1, wherein the operations further comprise providing negative keyword variations with the negative keyword.

6. The computer readable storage medium of claim 1, wherein the negative keyword comprises at least one of a word, a term, or a phrase.

7. The computer readable storage medium of claim 6, wherein the negative keyword comprises the negative keyword combined with variations of the negative keyword.

8. The computer-readable storage medium of claim 1, wherein the operations further comprise:
- comparing the search query data and the advertiser data;
- determining based on the comparing whether an advertisement was blocked from being shown to a user due to the negative keyword appearing in a search query data received from a user; and
- storing an indication that the advertisement was blocked in the memory element.

9. The computer-readable storage medium of claim 1, wherein the operations further comprise:
- receiving a request for a report.

10. A system comprising:
one or more processors configured to execute instructions to perform operations comprising:
- retrieving a database record from a database stored in a memory element, the record storing search query data received from a plurality of computing devices via a computer network over a predetermined period of time;
- receiving, via the computer network from a second computing device of an advertiser, advertiser data comprising a negative keyword that blocks an advertisement from display responsive to the search query data including the negative keyword;
- receiving, from a source, negative keyword variations of the negative keyword;
- storing the negative keyword variations;
- merging the negative keyword variations with the negative keyword;
- matching the search query data to at least the negative keyword, the negative keyword merged with the negative keyword variations;
- determining, based on the matching, that the advertisement was blocked due to a negative keyword variation of the negative keyword;
- storing an indication that the determined advertisement was blocked due to the search query data matching at least the negative keyword variation;
- generating, using the stored indication, a report that identifies the advertisement was blocked from display in response to the search query data including the negative keyword variation, the search query data filtered out from the report based on a privacy threshold; and
- transmitting, via the computer network to the second computing device for display on a display device coupled to the second computing device, the report.

11. The system of claim 10, wherein the report comprises queries received in a predetermined period of time.

12. The system of claim 11, wherein the predetermined period of time is approximately one day.

13. The system of claim 10, further configured to merge negative keyword suggestions with the negative keyword.

14. The system of claim 10, wherein the negative keyword comprises at least one of a word, a phrase, or a quotation.

15. The system of claim 14, wherein the negative keyword comprises variations of the keyword.

* * * * *